(12) United States Patent
Wang (10) Patent No.: US 12,074,795 B2
(45) Date of Patent: Aug. 27, 2024

(54) ROUTER, METHOD FOR ROUTER, COMPUTER-READABLE MEDIUM AND APPARATUS

(71) Applicant: ARRIS Enterprises LLC, Suwanee, GA (US)

(72) Inventor: Xin Wang, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/330,747

(22) Filed: May 26, 2021

(65) Prior Publication Data

US 2022/0021614 A1    Jan. 20, 2022

(30) Foreign Application Priority Data

Jul. 17, 2020 (CN) .......................... 202010693265.X (51) Int. Cl.
*H04L 45/74* (2022.01)
*H04L 61/5007* (2022.01)

(52) U.S. Cl.
CPC .......... *H04L 45/74* (2013.01); *H04L 61/5007* (2022.05)

(58) Field of Classification Search
CPC ............................ H04L 45/74; H04L 61/5007
USPC ........................................................ 370/392
See application file for complete search history.

(56) References Cited

U.S. PATENT DOCUMENTS

| 8,194,674 | B1 |   | 6/2012  | Pagel et al. |
| 9,059,901 | B1 | * | 6/2015  | Kumar C S .......... H04L 49/557 |
| 10,122,828 | B1 | * | 11/2018 | Verma ..................... H04L 67/01 |
| 10,412,004 | B2 |   | 9/2019  | Ong et al. |

(Continued)

FOREIGN PATENT DOCUMENTS

| CN | 106982270 | 7/2017 |
| WO | WO-2013169948 A1 * 11/2013 ............. G06F 9/451 |

OTHER PUBLICATIONS

Intelligent bridges and routers—a proposal for the LAN/MAN/B-ISDN environment M. Burak [Conference Record] GLOBECOM '92—Communications for Global Users: IEEE Year: 1992 | Conference Paper | Publisher: IEEE (Year: 1992).*

(Continued)

*Primary Examiner* — Jeffrey R Swearingen
(74) *Attorney, Agent, or Firm* — Wenderoth, Lind & Ponack, L.L.P.

(57) ABSTRACT

A router including a memory having instructions stored thereon; and a processor configured to execute the instructions stored on the memory to cause the router to perform at least the following: acquiring a private network data packet from a private network, and attaching identification information to the private network data packet, the identification information indicating via which port of a plurality of ports of the router the private network data packet is acquired; determining whether a bridge mode is set for the port indicated by the identification information of the private network data packet; in response to the determining that the bridge mode is set for the port indicated by the identification information of a first private network data packet acquired, assigning a public network IP address to the first private network data packet; and transmitting the first private network data packet by using the public network IP address.

20 Claims, 5 Drawing Sheets

(56) References Cited

U.S. PATENT DOCUMENTS

| | | | | |
|---|---|---|---|---|
| 2006/0114894 | A1* | 6/2006 | Cherchali | H04L 61/2596 709/245 |
| 2007/0286393 | A1* | 12/2007 | Roever | G06Q 20/1235 379/221.1 |
| 2010/0118882 | A1* | 5/2010 | Gao | H04L 12/4633 370/469 |
| 2013/0346629 | A1* | 12/2013 | Wang | H04L 61/2532 709/245 |
| 2015/0319042 | A1* | 11/2015 | PalChaudhuri | H04L 12/4641 370/395.53 |
| 2016/0192403 | A1* | 6/2016 | Gupta | H04W 12/088 455/411 |
| 2016/0261457 | A1* | 9/2016 | Gupta | H04L 41/0672 |
| 2017/0171149 | A1* | 6/2017 | Cheng | H04L 63/1441 |
| 2018/0048540 | A1* | 2/2018 | Zhang | H04L 61/5014 |
| 2019/0089558 | A1* | 3/2019 | Hirose | H04L 12/40091 |
| 2019/0230034 | A1* | 7/2019 | Indiresan | H04L 49/354 |

OTHER PUBLICATIONS

Intelligent bridges and routers—a proposal for the LAN/MAN/B-ISDN environment M. Burak [Conference Record] GLOBECOM '92—Communications for Global Users: IEEE Year: 1992 | Conference Paper | Publisher: IEEE (Year: 1992) (Year: 1992).*

Intelligent bridges and routers—a proposal for the LAN/MAN/B-ISDN environment M. Burak [Conference Record] GLOBECOM '92—Communications for Global Users: IEEE Year: 1992 | Conference Paper | Publisher: IEEE (Year: 1992) (Year: 1992) (Year: 1992).*

International Search Report and the Written Opinion of the International Searching Authority dated Oct. 11, 2021 in International (PCT) Application No. PCT/US2021/034147.

International Preliminary Report on Patentability dated Jan. 17, 2023 in International (PCT) Application No. PCT/US2021/034147.

* cited by examiner

ROUTER, METHOD FOR ROUTER, COMPUTER-READABLE MEDIUM AND APPARATUS

TECHNICAL FIELD

The present disclosure relates to the field of routers, and more particularly, to routers capable of providing a bridge mode.

BACKGROUND

In a bridge mode of a router, a public network IP address is assigned to a terminal device in a private network so that the terminal device in the private network can be recognized by devices in the public network. By setting the bridge mode, the terminal device in the private network is able to share resources and exchange information with devices in the public network, and thus the terminal device may be used as, e.g., a server.

A bridge mode functionality may be provided through an Ethernet port in the router. For example, a user of a terminal device in the private network may connect the terminal device to an Ethernet port of a router and set the routing mode of the Ethernet port to a bridge mode, thereby a bridge functionality is implemented with the Ethernet port.

SUMMARY

With the continuous research and development of router functionalities, the types of ports that can be provided by routers are becoming more and more abundant. For example, in addition to an Ethernet port, the router may include a Multimedia over Coax Alliance (MoCA) port, a Wireless Fidelity (Wi-Fi) port, a Universal Serial Bus (USB) port, and the like. By connecting these ports on the router with the terminal device in the private network, the terminal device can also be accessed into the network, so that the Internet accessing functionality of the terminal device is realized.

However, the inventor of the present disclosure has noticed that although routers can provide diversified ports, ports (e.g., MoCA port, Wi-Fi port, USB port, etc.) other than the Ethernet port cannot directly provide the bridge mode functionality. Thus, the diversity of bridge modes of the router is limited. For example, a terminal device in a private network may not have an Ethernet interface but only have a MoCA interface, in which case the terminal device cannot implement a bridge functionality by connecting to an Ethernet port of a route.

The present disclosure provides a router, a method for a router, a computer-readable medium, and an apparatus, which can provide a diversity of bridge modes, thereby providing a user of a terminal device with a more accurate selection of the bridge modes, enhancing convenience of use, and improving user experience.

According to one aspect of the present disclosure, there is provided a router. The router may comprise a plurality of ports; a memory having instructions stored thereon; and a processor configured to execute the instructions stored on the memory to cause the router to perform at least the following: acquiring a private network data packet from a private network via one of the ports, and attaching identification information to the private network data packet, the identification information indicating via which port of the plurality of ports of the router the private network data packet has been acquired; determining whether a bridge mode is set for the port indicated by the identification information of the private network data packet; in response to the determining that the bridge mode is set for the port indicated by the identification information of a first private network data packet acquired, assigning a public network IP address to the first private network data packet; and transmitting the first private network data packet by using the public network IP address.

In some embodiments, the plurality of ports include at least one of an Ethernet port, a MoCA port, a Wi-Fi port, and a USB port.

In some embodiments, a plurality of private network data packets from the private network acquired via different ones of the plurality of ports of the router use a same subnet.

In some embodiments, the processor is further configured to execute the instructions stored on the memory to cause the router to perform at least the following: determining whether the bridge mode is set for the port indicated by the identification information according to a preset bridge mode table in which a correspondence relationship between at least one of the plurality of ports and the bridge mode is recorded.

In some embodiments, the bridge mode table is preset by a user of the private network or a network service provider.

In some embodiments, the processor of the router is further configured to execute the instructions stored on the memory to cause the router to perform at least the following: storing the public network IP address in association with a private network IP address that is a source address of the first private network data packet.

In some embodiments, the processor is further configured to execute the instructions stored on the memory to cause the router to perform at least the following: in a case where a source address of a second private network data packet acquired matches a stored private network IP address and the bridge mode is set for the port indicated by the identification information of the second private network data packet, transmitting the second private network data packet by using the public network IP address associated with the stored private network IP address.

In some embodiments, the processor of the router is further configured to execute the instructions stored on the memory to cause the router to perform at least the following: acquiring a public network data packet from a public network; and transmitting the public network data packet by using a private network IP address associated with a stored public network IP address in a case where a public network IP address that is a destination address of the public network data packet matches the stored public network IP address.

According to another aspect of the present disclosure, there is provided a method for a router. The method may comprise: acquiring a private network data packet from a private network, and attaching identification information to the private network data packet, the identification information indicating via which port of a plurality of ports of the router the private network data packet has been acquired; determining whether a bridge mode is set for the port indicated by the identification information of the private network data packet; in response to the determining that the bridge mode is set for the port indicated by the identification information of a first private network data packet acquired, assigning a public network IP address to the first private network data packet; and transmitting the first private network data packet by using the public network IP address.

In some embodiments, whether the bridge mode is set for the port indicated by the identification information is determined according to a preset bridge mode table in which a correspondence relationship between at least one of the plurality of ports and the bridge mode is recorded.

In some embodiments, the method further comprises: storing the public network IP address in association with a private network IP address that is a source address of the first private network data packet.

In some embodiments, in a case where a source address of a second private network data packet acquired matches a stored private network IP address and the bridge mode is set for the port indicated by the identification information of the second private network data packet, the second private network data packet is transmitted by using the public network IP address associated with the stored private network IP address.

In some embodiments, the method further comprises: acquiring a public network data packet from a public network; and transmitting the public network data packet by using a private network IP address associated with a stored public network IP address in a case where a public network IP address that is a destination address of the public network data packet matches the stored public network IP address.

According to yet another aspect of the present disclosure, there is provided a non-transitory computer-readable medium for use with a processor, the non-transitory computer-readable medium having stored thereon instructions that, when executed by the processor, implement at least the following: acquiring a private network data packet from a private network, and attaching identification information to the private network data packet, the identification information indicating via which port of a plurality of ports of a router the private network data packet has been acquired; determining whether a bridge mode is set for the port indicated by the identification information of the private network data packet; in response to the determining that the bridge mode is set for the port indicated by the identification information of a first private network data packet acquired, assigning a public network IP address to the first private network data packet; and transmitting the first private network data packet by using the public network IP address.

In some embodiments, the non-transitory computer readable medium further has stored thereon instructions that, when executed by the processor, implement at least the following: determining whether the bridge mode is set for the port indicated by the identification information according to a preset bridge mode table in which a correspondence relationship between at least one of the plurality of ports and the bridge mode is recorded.

BRIEF DESCRIPTION OF THE DRAWINGS

To better understand the present disclosure and to show how to implement the present disclosure, reference will now be made, by way of example, to the accompanying drawings, in which.

Note that like reference numerals refer to corresponding parts throughout the drawings.

DETAILED DESCRIPTION

The following detailed description is made with reference to the accompanying drawings and is provided to assist in a comprehensive understanding of various exemplary embodiments of the disclosure. The following description includes various details to aid understanding, but these details are to be regarded as examples only and are not intended to limit the disclosure, which is defined by the appended claims and their equivalents. The words and phrases used in the following description are intended only to provide a clear and consistent understanding of the disclosure. In addition, descriptions of well-known structures, functions, and configurations may be omitted for clarity and conciseness. Those of ordinary skill in the art will recognize that various changes and modifications of the examples described herein can be made without departing from the spirit and scope of the disclosure.

Figure 1:
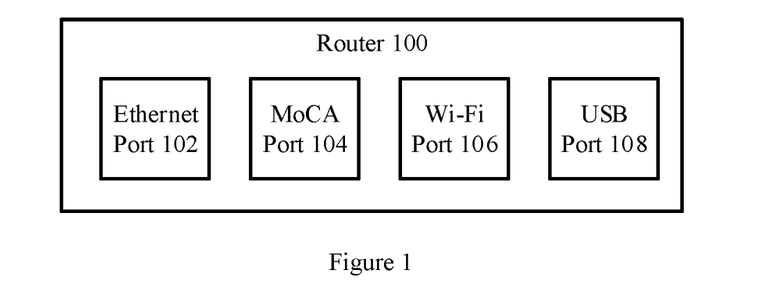
FIG. 1 shows a schematic diagram of a plurality of ports of a router according to an embodiment of the present disclosure.

FIG. 1 shows a schematic diagram of a plurality of ports of a router 100 according to an embodiment of the present disclosure.

As shown in FIG. 1, in some embodiments, the router 100 may comprise an Ethernet port 102, a MoCA port 104, a Wi-Fi port 106, and a USB port 108 for connecting with an Ethernet interface, a MoCA interface, a Wi-Fi interface, and a USB interface of a terminal device in a private network, respectively, to provide corresponding functionalities.

The Ethernet port 102 may be a physical port configured on the router 100, which is connected to and in communication with an Ethernet port of a terminal device via, e.g., a network cable. The MoCA port 106 may be a physical port configured on the router 100, which is connected to and in communication with a MoCA interface of the terminal device via, e.g., a coaxial cable. The USB port 108 may be a physical port configured on router 100, which is connected to and in communication with a USB port of the terminal device via, e.g., a USB connection line. In addition, the Wi-Fi interface may be, e.g., a virtual port implemented by a processor of the router 100, which is connected to and in communication with a Wi-Fi interface of the terminal device in a wireless manner (e.g. in a 2.4 GHz frequency band and/or a 5 GHz frequency band).

It should be understood that although FIG. 1 illustrates the case where the router 100 comprises the Ethernet port 102, the MoCA port 104, the Wi-Fi port 106, and the USB port 108, the router according to the embodiments of the present disclosure need not include all such ports. In addition, the router according to the embodiments of the present disclosure may be configured to comprise a port different from the aforementioned ports according to user requirements and the like.

In addition, while FIG. 1 illustrates one of each of the Ethernet port 102, the MoCA port 104, the Wi-Fi port 106, and the USB port 108, the router 100 may be configured with a plurality of Ethernet ports 102, a plurality of MoCA ports 104, a plurality of Wi-Fi ports 106, and/or a plurality of USB ports 108 according to user requirements and the like, to implement connection and communication with more terminal devices.

Figure 2:
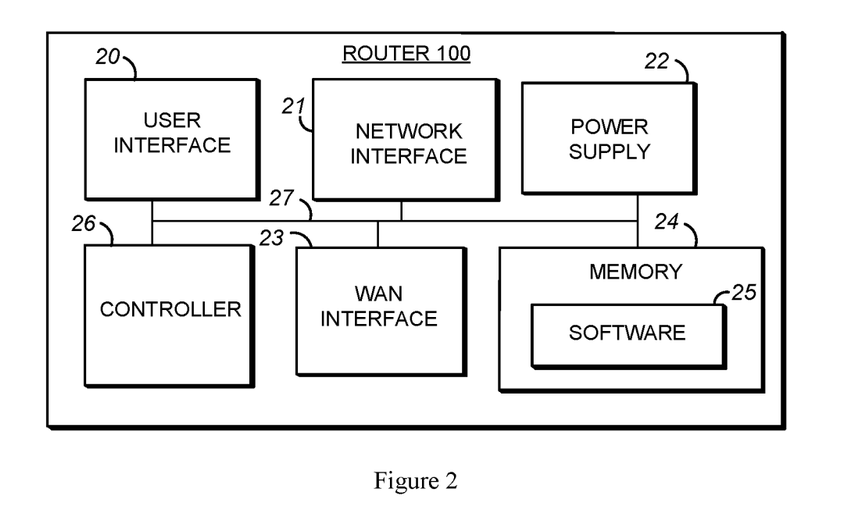
FIG. 2 shows an exemplary configuration block diagram of a router according to an embodiment of the present disclosure.

FIG. 2 illustrates an exemplary configuration block diagram of a router 100 according to an embodiment of the present disclosure. The router 100 of FIG. 2 may correspond to, e.g., the router 100 as shown in FIG. 1, comprising one or more of the plurality of ports shown in FIG. 1.

While referred to herein as a router, the router 100 can be, for example, a hardware electronic device that can combine the functions of a modem, an access point, and/or a router. It is also contemplated by the present disclosure that the router 100 can include the function of, but is not limited to, an IP/QAM Set Top Box (STB) or Smart Media Device (SMD) that is capable of decoding audio/video content, and playing OTT or MSO provided content.

As shown in FIG. 2, the router 100 includes a user interface 20, a network interface 21, a power supply 22, a WAN interface 23, a memory 24, and a controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device. The network interface 21 may include various network cards, and circuitry implemented in software and/or hardware to enable communications with wireless extender devices and client devices using wireless protocols, such as any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands, RF4CE protocol, ZigBee protocol, Z-Wave protocol, or IEEE 802.15.4 protocol.

The power supply 22 supplies power to the internal components of the router 100 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery. The WAN interface 23 may include various network cards, and circuitry implemented in software and/or hardware to enable communications between the router device and an internet service provider or multiple systems operator (MSO).

The memory 24 includes a single memory or one or more memories or memory locations that include, but are not limited to, a Random Access Memory (RAM), a Dynamic Random Access Memory (DRAM), a Static Random Access Memory (SRAM), a Read Only Memory (ROM), an EPROM, an EEPROM, a flash memory, logic blocks of a FPGA, hard disk, or any other various layers of memory hierarchy. The memory 24 can be used to store any type of instructions, software, or algorithm including software 25 for controlling the general functions and operations of the router 100.

The controller 26 controls the general operations of the router 100 as well as performs management functions related to the other devices (such as extenders and client devices) in the network. The controller 26 can include, but is not limited to, a CPU, a hardware microprocessor, a hardware processor, a multi-core processor, a single core processor, a microcontroller, an Application Specific Integrated Circuit (ASIC), a DSP, or other similar processing device capable of executing any type of instructions, algorithms, or software for controlling the operation and functions of the router 100 in accordance with the embodiments described in the present disclosure. The controller 26 may be various implementations of digital circuitry, analog circuitry, or mixed signal (a combination of analog and digital) circuitry that perform functionalities in a computing system. The controller 26 may include, e.g., such a circuit like an Integrated Circuit (IC), portions or circuits of an individual processor core, an entire processor core, an individual processor, a programmable hardware device such as a Field Programmable Gate Array (FPGA), and/or a system including a plurality of processors.

Communication between the components (e.g., 20-22, 24, and 26) of the router 100 may be established using the internal bus 27.

Figure 3:
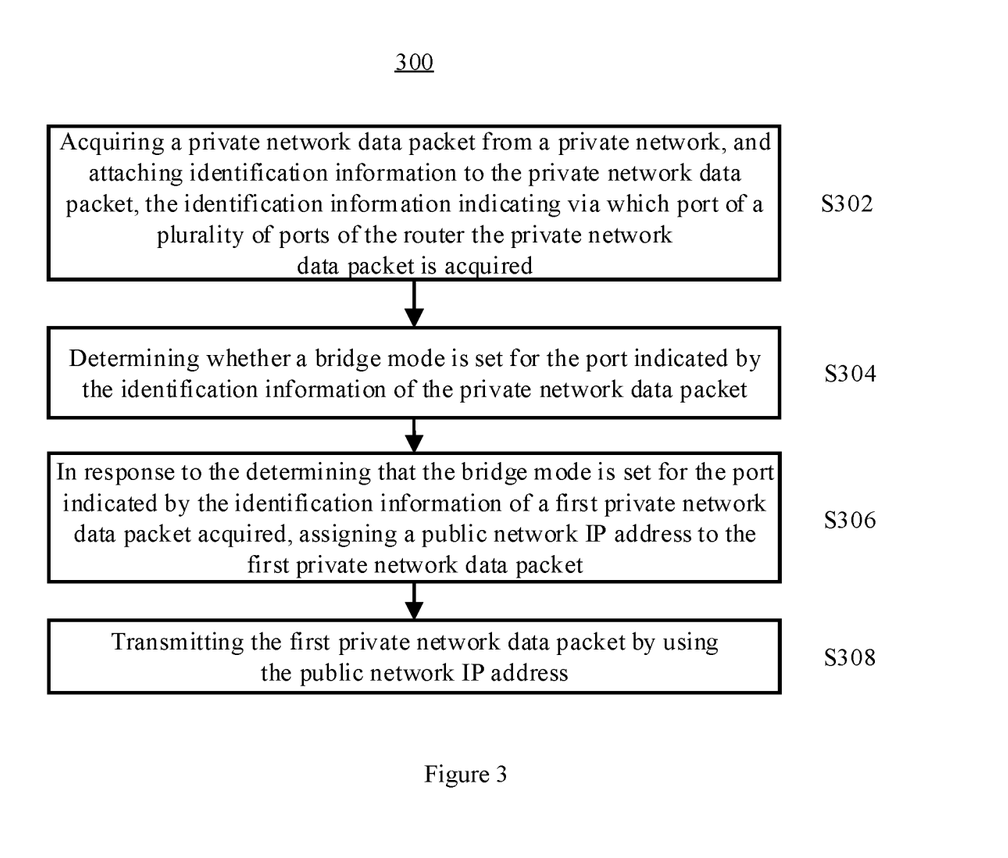
FIG. 3 shows an exemplary flow diagram of a method for a router according to an embodiment of the present disclosure.

FIG. 3 shows a flow diagram of a method 300 for a router according to an embodiment of the present disclosure. The method 300 may be used for the router 100 as shown in FIGS. 1 and 2, for example. The router and the method for the router according to the embodiment of the present disclosure will be described in detail below with reference to FIG. 2 and FIG. 3.

As shown in FIG. 3, in step S302, the controller 26 acquires a private network data packet from a private network, and attaches identification information to the private network data packet, the identification information indicating via which port of a plurality of ports of the router the private network data packet is acquired.

It should be understood that the private network described in the present disclosure is a network space in a local area, such as a Local Area Network, and may be set up at home, in an office, a factory area, or other area. A terminal device (an electronic device such as a personal computer, a smart phone, or a television) within a private network is able to share resources and exchange information over the private network. In addition, the private network is logically isolated from other networks (other private networks, a public network, etc.), and a terminal device within the private network cannot communicate with devices within other networks directly, but with the help of functionalities of a router. In addition, the public network is, for example, a Wide Area Network such as the Internet.

In some embodiments, the controller 26 may acquire a plurality of private network data packets, such as PR1, PR2, PR3, PR4, . . . , from the private network. The plurality of private network data packets may be received, for example, by one or more of ports 102-108 of the router 100 shown in FIG. 1. In some embodiments, the controller 26 may be configured to receive private network data packets from the various ports 102-108 of the router.

In some embodiments, the controller 26 may attach corresponding identification information to the private network data packet (e.g., PR1, PR2, PR3, PR4). Table 1 below illustrates a case where the controller 26 attaches identification information to the plurality of private network data packets respectively, where identification information "00" indicates that PR1 is acquired via the Ethernet port of the router, identification information "01" indicates that PR2 is acquired via the MoCA port of the router, identification information "10" indicates that PR3 is acquired via the Wi-Fi port of the router, and identification information "11" indicates that PR4 is acquired via the USB port of the router.

TABLE 1

| Private Network Data Packet | Identification Information | Port Indicated by Identification Information |
|---|---|---|
| PR1 | 00 | Ethernet Port |
| PR2 | 01 | MoCA Port |
| PR3 | 10 | Wi-Fi Port |
| PR4 | 11 | USB Port |

In the above Table 1, the identification information includes 2-bit binary information to distinguish four different ports of the router. In the case where the router 100 includes a greater number of ports, more bits may be used to indicate the identification information. In addition, the identification information may be indicated in other manner, and the form of the identification information is not limited in the present disclosure.

In some embodiments, the aforementioned identification information may be attached to a position of a header of the private network data packet, for example, so that a bridge mode determination unit 208 described later can easily acquire the identification information. It should be understood that, in the present disclosure, the position where the identification information is attached to the private network data packet is not particularly limited either, and those skilled in the art can make a flexible design according to a specific frame format of the data packet.

In step S304, the controller 26 determines whether a bridge mode is set for the port indicated by the identification information of the private network data packet.

In some embodiments, the controller 26 may determine whether a bridge mode is set for the port indicated by the identification information of the private network data packet according to a preset bridge mode table. In the bridge mode table, for example, a correspondence relationship between at least one of the plurality of ports of the router and the bridge mode is recorded.

Table 2 below illustrates a bridge mode table according to an embodiment of the present disclosure, in which the corresponding ports are indicated by using identification information. In some embodiments, for example, in a case where the controller 26 acquires PR1 and attaches identification information "00" (Ethernet port) to PR1, the controller 26 determines that the bridge mode corresponding to the Ethernet port indicated by the identification information "00" is in a "disabled" state, according to Table 2. In this case, the controller 26 determines that the data packet PR1 is not a data packet to be bridged, so that, for example, the bridge operation may be ended.

In addition, in a case where the controller 26 acquires PR2 and attaches identification information "01" (MoCA port) to PR2, the controller 26 determines that a bridge mode corresponding to the MoCA port indicated by the identification information "01" is in an "enabled" state, according to Table 2. In this case, the controller 26 will perform a corresponding IP address assignment operation related to the bridge mode using the information, which will be described later.

TABLE 2

| Identification Information | Bridge Mode |
|---|---|
| 00 (Ethernet Port) | Disabled |
| 01 (MoCA Port) | Enabled |
| 10 (Wi-Fi Port) | Disabled |
| 11 (USB Port) | Enabled |

It should be understood that a correspondence relationship between all ports of the router and the bridge mode is recorded in Table 2 above. In some embodiments, only ports whose bridge mode is "enabled" may be recorded to save memory space.

In some embodiments, the bridge mode table may be preset by a user of the private network. For example, in case where a user wishes to use a bridge mode for his/her terminal device, the user may set a port (e.g., a MoCA port) of the router 100 to which the terminal device is to be connected by a Graphical User Interface (GUI) in a Web format or an application etc., and set the bridge functionality of the port to be "enabled". The user connects the terminal device to the port of the router 100, for which the bridge mode is set, then the functionality of the bridge mode can be implemented.

In some other embodiments, the bridge mode table may be preset by a network service provider. For example, the network service provider may help the user to preset a port (e.g., a MoCA port) of the router 100 to which the user's terminal device is to be connected, and set the bridge functionality of the port to be "enabled", according to the user's requirements. In some embodiments, the setting of the bridge mode table by the network service provider may be implemented by, for example, the Simple Network Management Protocol (SNMP) or the CPE WAN Management Protocol (CWMP, also referred to as TR069).

In addition, in some embodiments, the user or the network service provider may set the port of the router to which the terminal device is to be connected to be "disabled" by a method similar to the above, thereby not using the bridge functionality.

In some embodiments, the bridge mode table may be stored, for example, in the memory 24 of the router 100 for lookup use by the controller 26. In some embodiments, the bridge mode tables of a plurality of routers may alternatively be stored in an external server or a cloud memory, and each of the plurality of router acquires a respective bridge mode table by querying the external server or the cloud memory.

In step S306, the controller 26 assigns a public network IP address to a first private network data packet acquired (e.g., PR 2), in response to determine that the bridge mode is set for the port indicated by the identification information of the first private network data packet.

In some embodiments, for example, in a case where the controller 26 determines that the bridge mode is set (set to "enabled" in Table 2) for the port (the MoCA port) indicated by the identification information "01" of PR2, the controller 26 transmits a Dynamic Host Configuration Protocol (DHCP) DISCOVER broadcast packet to DHCP servers to request to lease an IP address. Next, the controller 26 selects one DHCP OFFER packet from among DHCP OFFER packets received from the DHCP servers, and uses the IP address provided in the DHCP OFFER packet as a public network IP address to be assigned to PR2. In addition, the controller 26 broadcasts in the network a DHCP REQUEST message packet indicating that the IP address provided by the one DHCP server has been accepted so as to cause all the other DHCP servers to revoke the IP addresses provided by them, thus the IP addresses may be provided to a next IP lease request. Thus, the public network IP address is assigned to PR2 by the controller 26.

In step S308, the controller 26 transmits the first private network data packet by using the public network IP address assigned by the controller 26.

In some embodiments, the first private network data packet (e.g., PR2) may be transmitted to the public network via a WAN port of the router 100 by using the public network IP address assigned by controller 26.

According to the router of the present disclosure, the bridge mode can be set for any one among the plurality of ports, so that the diversity of the bridge modes can be provided, a more accurate selection of the bridge modes can be provided for a user of the terminal device, the convenience of use can be enhanced, and the user experience can be improved.

In some embodiments, the plurality of ports of the router may include at least two of an Ethernet port, a MoCA port, a Wi-Fi port, a USB port, for example. Accordingly, the router according to the present disclosure can provide the bridge modes for different ports respectively, and can provide the bridge mode for the terminal device of the user even in the case where the user's terminal device has, for example, only an interface (for example, only a MoCA interface, etc.) matching one of the plurality of ports. In addition, the router according to the present disclosure can provide the diversity of the bridge modes, so that a user can freely select which port is to be used to implement the bridge mode according to convenience of use, the condition for interface(s) of the terminal device, and the like, thereby providing a more accurate selection of the bridge modes for the user of the terminal device, improving convenience of use, and improving user experience.

In some embodiments, the plurality of ports of the router may further include, for example, a plurality of Ethernet ports, a plurality of MoCA ports, a plurality of Wi-Fi ports, or a plurality of USB ports. For example, in a case where the plurality of ports of the router include a plurality of (e.g., two) MoCA ports, different identification information may be attached to private network data packets acquired via the two MoCA ports, respectively, to distinguish the two MoCA ports. According to the embodiment, richer interface selections can be provided, and the bridge functionality can be provided for more terminal devices.

In some embodiments, a plurality of private network data packets from the private network acquired via different ones of the plurality of ports of the router use a same subnet. For example, the private network data packets PR2 and PR4 described above are acquired from the MoCA port and the USB port, respectively, and for these two packets PR2 and PR4, since the identification information "01" and "10" corresponding to the MoCA port and the USB port are attached, respectively, the same subnet resource may be used without collision, thereby network resources may be saved. In some embodiments, the private network data packets acquired via the plurality of ports may all use the same subnet as the Ethernet port. Thus, the diversity of the bridge modes can be implemented without occupying new network resources.

In some embodiments, in the case where the bridge mode is implemented by using the Wi-Fi port of the router, the bridge mode for a certain terminal device may be implemented by using a first frequency band, (e.g., one of the 2.4 GHz, 5 GHz, or 6 GHz frequency bands), and the normal Internet access functionality for other terminal devices may be implemented by using a second frequency band, (e.g., another of the 2.4 GHz, 5 GHz, or 6 GHz frequency bands). Therefore, the bridge mode and the normal Internet access functionality can be implemented at the same time without producing conflict of network resources.

Next, an exemplary flow diagram of a method 400 for a router according to another embodiment of the present disclosure is described with reference to FIG. 4. The method 400 may be used, for example, for the router 100 as shown in FIG. 2. In the method 400, steps S302 to S308 are the same as in the method 300 described with reference to FIG. 3, so the same reference numerals are attached and the description thereof is omitted. Hereinafter, only step S402 which is different from the method 300 in FIG. 3 will be described.

Figure 4:
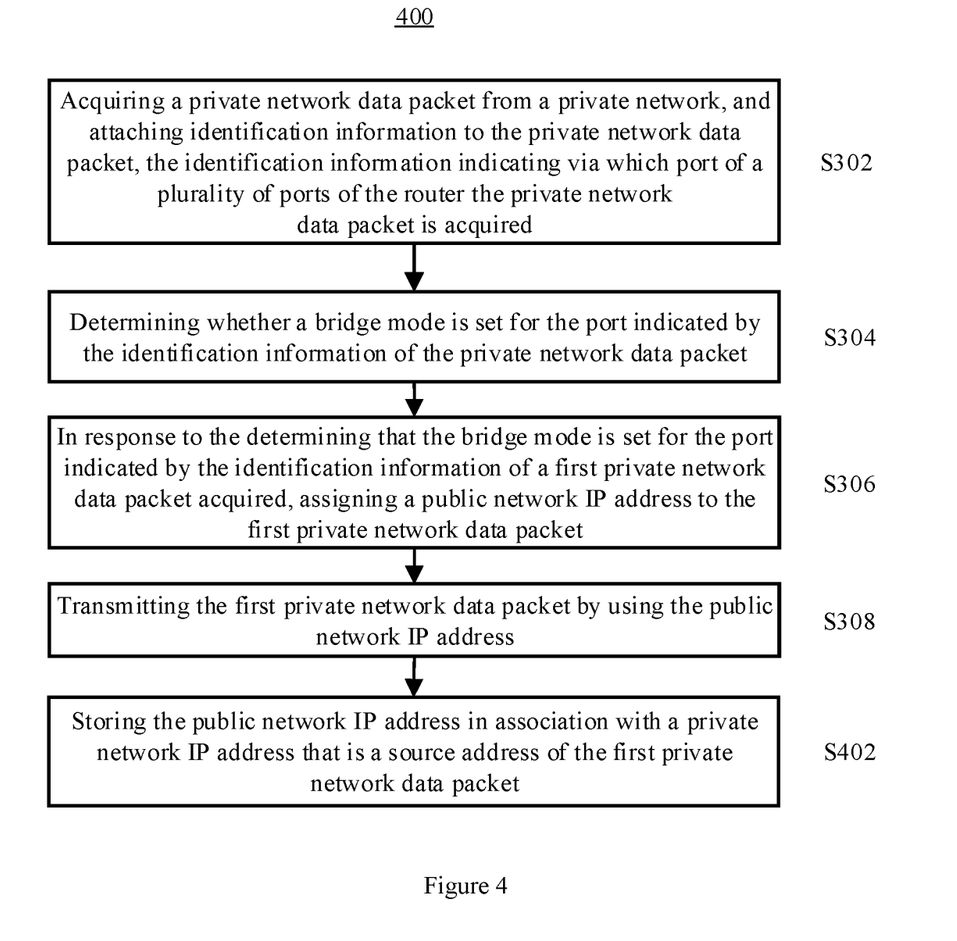
FIG. 4 shows an exemplary flow diagram of a method for a router according to another embodiment of the present disclosure.

As shown in FIG. 4, in some embodiments, in step S402, the public network IP address assigned by the controller 26 in step S306 may be stored in association with the private network IP address that is the source address of the first private network data packet (e.g., PR2). In FIG. 4, this step S402 is illustrated as being performed after step S308, however, step S402 may alternatively be performed before step S308 and after step S306.

Table 3 below illustrates the two public network IP addresses stored and the two private network IP addresses associated therewith. The private network IP addresses "192.168.1.100" and "192.168.1.200" correspond to two terminal devices in the private network, respectively, and the public network IP addresses "122.108.24.100" and "122.108.24.200" indicate public network IP addresses assigned to the two terminal devices.

TABLE 3

| Private Network IP Address | Public Network IP Address |
|---|---|
| 192.168.1.100 | 122.108.24.100 |
| 192.168.1.200 | 122.108.24.200 |

In some embodiments, the public network IP address and the private network IP address associated therewith may be stored, for example, in the memory 24 of the router 100. In some embodiments, public network IP addresses of a plurality of routers and private network IP addresses associated therewith may alternatively be stored in an external server or a cloud memory, and each router acquires required information by querying the external server or the cloud memory.

In some embodiments, in a case where the source address of a second private network data packet acquired by the controller 26 matches a stored private network IP address and it is determined by the controller 26 that the bridge mode is set for the port indicated by the identification information of the second private network data packet, the second private network data packet is transmitted by using the public network IP address associated with the stored private network IP address.

For example, in the case where the source address of the second private network data packet is "192.168.1.100", which is the same as the private network IP address "192.168.1.100" stored in Table 3, it is indicated that a transmission source (terminal device) of the second private network data packet has previously transmitted data packet (s) to the router, and the router has assigned the public network IP address "122.108.24.100" to the transmission source. In addition, it is determined by the controller 26 that the bridge mode is set for the port indicated by the identification information of the second private network data packet, which indicates that the data packet is transmitted via the port for which the bridge mode is set and needs to implement the functionality of the bridge mode. In this case, the second private network data packet is transmitted by using the public network IP address "122.108.24.100" that has been previously assigned to the transmission source.

Accordingly, it is unnecessary to reassign the public network IP address each time the private network data packet is acquired, which saves the computational overhead and the network resources and improves the transmission efficiency of the data packets.

Next, an exemplary flow diagram of a method 500 for a router according to yet another embodiment of the present disclosure is described with reference to FIG. 5. The method 500 may be used, for example, for the router 100 shown in FIG. 2. In the method 500, steps S302 to S308 are the same as in the method 300 described with reference to FIG. 3, and step S402 is the same as in the method 400 described with reference to FIG. 4, so the same reference numerals are attached and the description is omitted. Hereinafter, only steps S502 and S504 which are different from the method 300 in FIG. 3 and the method 400 in FIG. 4 will be described.

Figure 5:
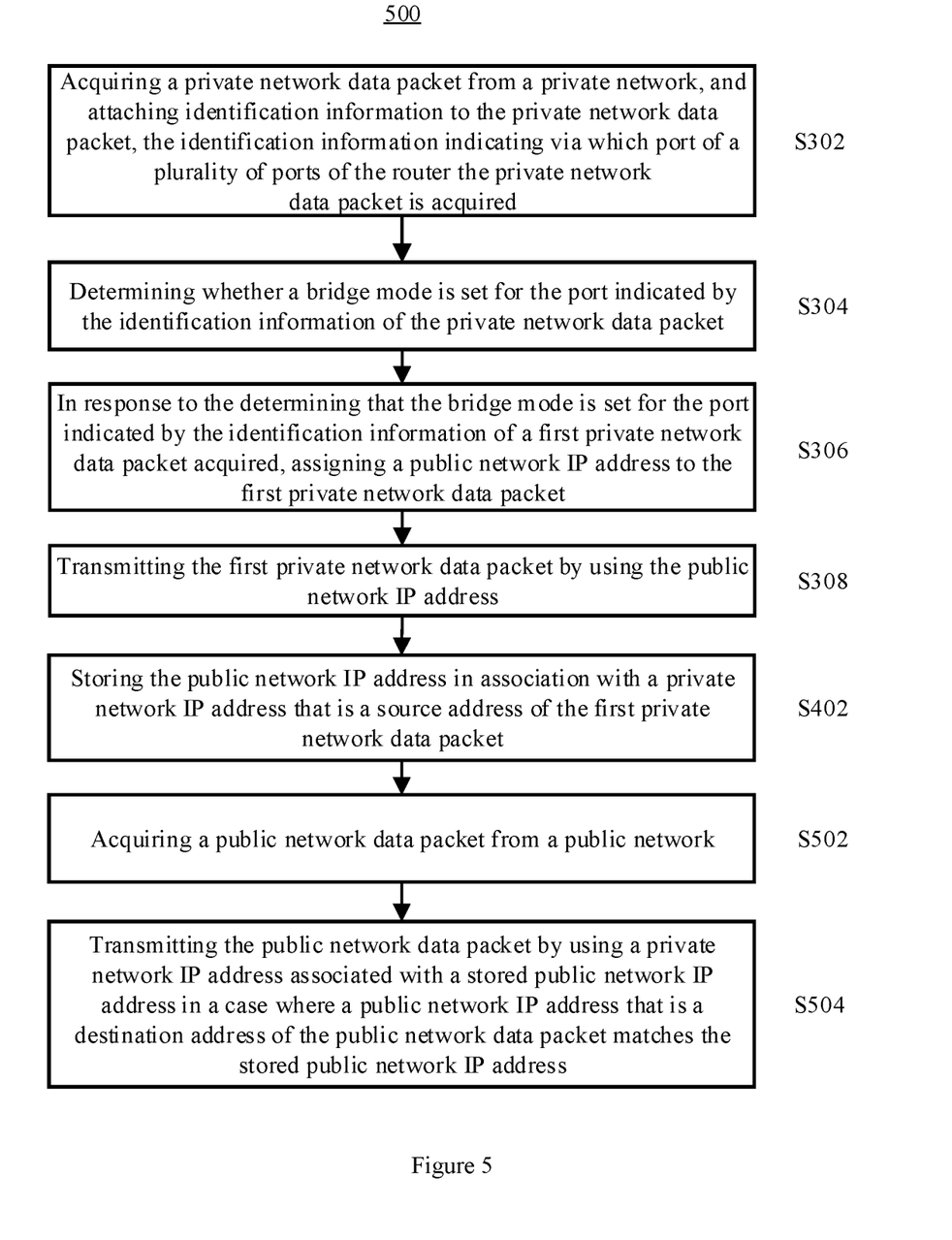
FIG. 5 shows an exemplary flow diagram of a method for a router according to yet another embodiment of the present disclosure.

As shown in FIG. 5, in some embodiments, in step S502, a public network data packet from a public network may be acquired. This step S502 may also be implemented by the controller 26 shown in FIG. 2, for example.

In some embodiments, the public network data packet is a data packet transmitted from a terminal device in the public network to a terminal device in the private network. The source address of the public network data packet indicates a public network IP address of the terminal device in the public network. In addition, since the terminal device in the public network cannot know the private network IP address of the terminal device in the private network, a destination address of the public network data packet only indicates the public network IP address. It is necessary to convert the public network IP address into the private network IP address through the bridge functionality of the router, so as to provide the public network data packet to the terminal device in the private network.

In step S504, in a case where the public network IP address that is the destination address of the public network data packet matches the stored public network IP address, the public network data packet is transmitted by using the private network IP address associated with the stored public network IP address.

For example, in the case where the destination address of the public network data packet is "122.108.24.200", which is the same as the public network IP address "122.108.24.200" in Table 3, the public network data packet is transmitted, by using the private network IP address "192.168.1.200" associated with the public network IP address, to the terminal device in the private network corresponding to the aforementioned private network IP address.

Accordingly, the terminal device in the private network can receive data packets from the public network through the bridge functionality of the router.

Next, an exemplary configuration block diagram of another electronic device 600 which can implement embodiments according to the present disclosure is described with reference to FIG. 6. For example, the electronic device 600 may be used to implement one or more of the methods 300-500 according to embodiments of the present disclosure.

Figure 6:
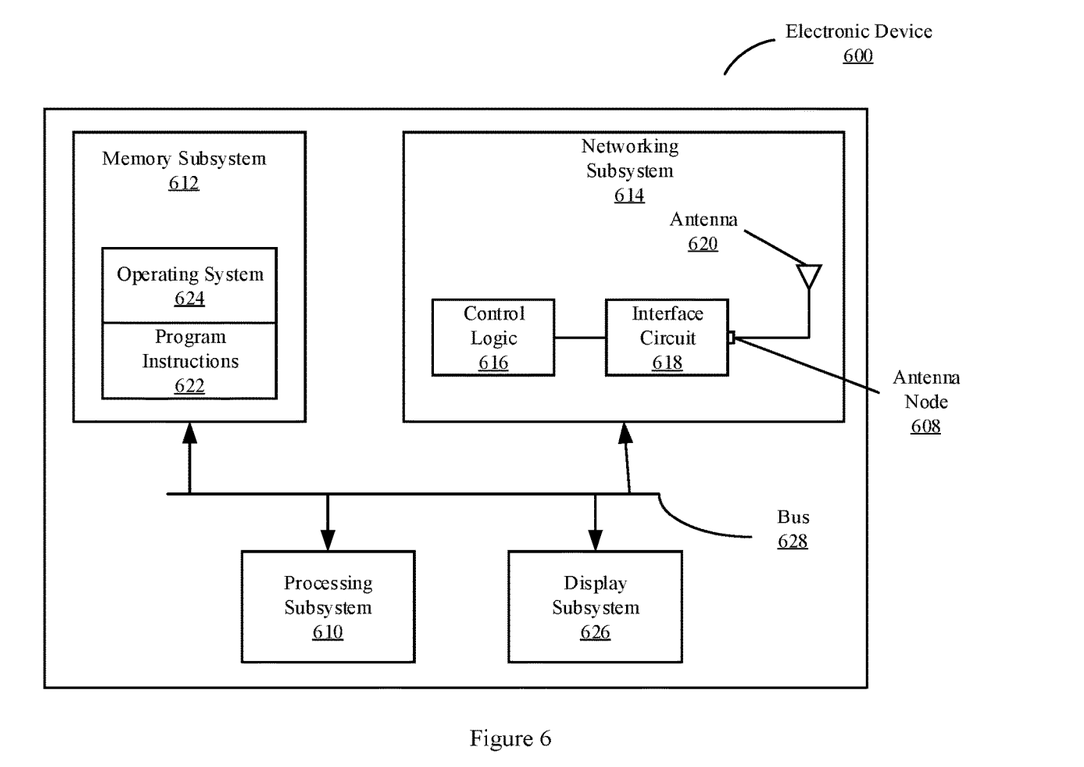
FIG. 6 illustrates an exemplary configuration of an electronic device which can implement embodiments according to the present disclosure.

As shown in FIG. 6, the electronic device 600 includes a processing subsystem 610, a memory subsystem 612, and a networking subsystem 614. The processing subsystem 610 includes one or more devices configured to perform computing operations. For example, the processing subsystem 610 may include one or more microprocessors, an ASIC, a microcontroller, a programmable logic device, a Graphics Processor Unit (GPU), and/or one or more Digital Signal Processors (DSPs).

The memory subsystem 612 includes one or more devices for storing data and/or instructions for the processing subsystem 610 and the networking subsystem 614. For example, the memory subsystem 612 may include a Dynamic Random Access Memory (DRAM), a Static Random Access Memory (SRAM), and/or other types of memories (sometimes collectively or individually referred to as "computer-readable storage media").

Additionally, the memory subsystem 612 may include a mechanism for controlling access to the memory. In some embodiments, the memory subsystem 612 includes a memory hierarchy that includes one or more caches coupled to the memory in the electronic device 600. In some of these embodiments, one or more of the caches are located in the processing subsystem 610.

In some embodiments, the memory subsystem 612 is coupled to one or more high capacity and large capacity storage devices (not shown). For example, the memory subsystem 612 may be coupled to a magnetic or optical driver, a solid state driver, or another type of large capacity storage device. In these embodiments, the electronic device 600 may use the memory subsystem 612 for fast access storage of frequently used data, while the large capacity storage device is used to store infrequently used data.

The networking subsystem 614 includes one or more devices configured to be coupled to and in communication over a wired and/or wireless network (i.e., to perform a network operation), including: a control logic 616, an interface circuit 618, and one or more antennas 620 (or antenna elements). Although FIG. 6 includes one or more antennas 620, in some embodiments, the electronic device 600 includes one or more nodes that may be coupled to one or more antennas 620, such as a node 608, for example a pad. Therefore, the electronic device 600 may or may not include one or more antennas 620. For example, the networking subsystem 614 may include a Bluetooth networking system, a cellular networking system (e.g., a 3G/4G/5G network, such as UMTS, LTE, etc.), a USB networking system, a networking system based on standards described in IEEE 802.11 (e.g., a Wi-Fi networking system), an Ethernet networking system, and/or another networking system.

The networking subsystem 614 includes a processor, a controller, a radio/antenna, a jack/plug, and/or other devices for coupling to, communicating over, and processing data and events for each supported network system. Note that sometimes mechanisms for coupling to, communicating over, and processing data and events over the network of each network system are collectively referred to a "network interfaces" of the network system. Furthermore, in some embodiments, a "network" or "connection" between electronic devices does not yet exist. Thus, the electronic device 600 may use the mechanisms in the networking subsystem 614 to perform simple wireless communications between electronic devices, e.g., transmission of frames and/or scanning of frames transmitted by other electronic devices.

Within the electronic device 600, the processing subsystem 610, the memory subsystem 612, and the networking subsystem 614 are coupled together by using a bus 628. The bus 628 may include an electrical, optical, and/or photoelectric connection of the subsystem that may be used to communicate commands and data, and the like. Although only one bus 628 is shown for clarity, different embodiments may include different numbers or configurations of electrical, optical, and/or photoelectric connections in the subsystems.

In some embodiments, the electronic device 600 includes a display subsystem 626 for displaying information on a display, which may include a display driver and a display, such as a liquid crystal display, a multi-touch screen, or the like.

The electronic device 600 may be (alternatively, be included in) any electronic device having at least one network interface. For example, the electronic device 600 may be (alternatively, be included in): a desktop computer, a laptop computer, a sub-notebook/netbook, a server, a computer, a mainframe computer, a cloud-based computer, a tablet computer, a smart phone, a cellular phone, a smart watch, a wearable device, a consumer electronic device, a portable computing device, an access point, a transceiver, a controller, a radio node, a router (e.g., the router 100 according to embodiments of the present disclosure), a switch, a communication device, an access point, a test device, and/or other electronic devices.

Although the electronic device 600 is described by using specific components, in alternative embodiments, different components and/or subsystems may be present in the electronic device 600. For example, the electronic device 600 may include one or more additional processing subsystems, a memory subsystem, a networking subsystem, and/or s display subsystem. Additionally, one or more of the subsystems may be not present in the electronic device 600. Furthermore, in some embodiments, the electronic device 600 may include one or more additional subsystems that are not shown in FIG. 6. Additionally, although a separate subsystem is shown in FIG. 6, in some embodiments, some or all of given subsystems or components may be integrated into one or more of the other subsystems or components in the electronic device 600. For example, in some embodiments, program instructions 622 are included in an operating system 624 and/or control logic 616 is included in an interface circuit 618.

Furthermore, any combination of analog and/or digital circuits may be used to implement circuits and components in the electronic device 600, including: bipolar, PMOS and/or NMOS gates or transistors. Further, signals in these embodiments may include digital signals having approximately discrete values and/or analog signals having continuous values. In addition, the components and circuits may be single ended or differential, and the power supply may be unipolar or bipolar.

Although some operations in the aforementioned embodiments are implemented in hardware or software, in general, the operations in the aforementioned embodiments may be implemented in a variety of configurations and architectures. Accordingly, some or all of the operations in the aforementioned embodiments may be performed in hardware, software, or both. For example, at least some operations in the communication techniques may be implemented using program instructions 622, an operating system 624 (such as a driver for the interface circuit 618), or in firmware in the interface circuit 618. Alternatively or additionally, at least some operations in the communication techniques may be implemented in hardware in a physical layer, such as the interface circuit 618.

The present disclosure may be implemented as any combination of devices, systems, integrated circuits, and computer programs on non-transitory computer readable media. One or more processors may be implemented as an Integrated Circuit (IC), an Application Specific Integrated Circuit (ASIC), or a large scale integrated circuit (LSI), a system LSI, an ultra LSI, or an ultra LSI package that performs some or all of the functionalities described in this disclosure.

The present disclosure includes the use of software, applications, computer programs, or algorithms. Software, applications, computer programs, or algorithms may be stored on a non-transitory computer readable medium to cause a computer, such as one or more processors, to perform the steps described above and depicted in the figures. For example, the one or more memories store software or algorithms in executable instructions and the one or more processors may associate a set of instructions to execute the software or algorithms to provide bridge functionality for a router according to embodiments described in the present disclosure.

Software and computer programs (which may also be referred to as programs, software applications, components, or code) include machine instructions for a programmable processor, and may be implemented in a high-level procedural, object-oriented, functional, logical, or assembly or machine language. The term "computer-readable medium" refers to any non-transitory computer program product, apparatus or device, such as magnetic disks, optical disks, solid-state storage devices, memories, and Programmable Logic Devices (PLDs), used to provide machine instructions or data to a programmable data processor, including a computer-readable medium that receives machine instructions as a computer-readable signal.

By way of example, computer-readable media may comprise Dynamic Random Access Memory (DRAM), Random Access Memory (RAM), Read Only Memory (ROM), electrically erasable read only memory (EEPROM), compact disk read only memory (CD-ROM) or other optical disk storage, magnetic disk storage or other magnetic storage devices, or any other medium which may be used to carry or store desired computer-readable program code in the form of instructions or data structures and which may be accessed by a general-purpose or special-purpose computer or a general-purpose or special-purpose processor. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above are also included within the scope of computer-readable media.

The subject matter of the present disclosure is provided as examples of apparatus, systems, methods, and programs for performing the features described in the present disclosure. However, other features or variations are contemplated in addition to the above-described features. It is contemplated that the implementation of the components and functions of the present disclosure may be accomplished with any emerging technology that may replace the technology of any of the implementations described above.

Additionally, the above description provides examples, and does not limit the scope, applicability, or configuration set forth in the claims. Changes may be made in the function and arrangement of elements discussed without departing from the spirit and scope of the disclosure. Various embodiments may omit, substitute, or add various procedures or components as appropriate. For example, features described with respect to certain embodiments may be combined in other embodiments.

Similarly, while operations are depicted in the drawings in a particular order, this should not be understood as requiring that such operations be performed in the particular order shown or in sequential order, or that all illustrated operations be performed, to achieve desirable results. In some cases, multitasking and parallel processing may be advantageous.

What I claim is:

1. A router, comprising:
a plurality of ports;
a memory having instructions stored thereon; and
a processor configured to execute the instructions stored on the memory to cause the router to perform at least the following:
acquiring a private network data packet from a private network via one of the ports, and attaching identification information to the private network data packet, the identification information indicates that the private network data packet was acquired via a particular port of the plurality of ports of the router, wherein the identification information distinguishes the particular port from one or more other ports of the plurality of ports;
determining that a bridge mode is set for the particular port indicated by the identification information of the private network data packet;
in response to determining that the bridge mode is set, transmit a request to lease a public network Internet Protocol (IP) address to one or more servers;
receive one or more packets from the one or more servers, wherein the one or more packets provide one or more IP addresses;
select a packet from the one or more packets, the packet received from a server of the one or more servers, wherein the packet provides an IP address of the one or more IP addresses;
use the IP address as the public network IP address;
broadcast acceptance of the public network IP address of the packet so as to cause the one or more servers other than the server to revoke one or more IP addresses provided by the one or more servers other than the server; and
assigning the public network IP address of the packet to the first private network data packet; and
transmitting the first private network data packet by using the public network IP address assigned.

2. The router according to claim 1, wherein
the plurality of ports includes at least one of an Ethernet port, a MoCA port, a Wi-Fi port, and a USB port.

3. The router according to claim 1, wherein
a plurality of private network data packets from the private network acquired via different ones of the plurality of ports of the router use a same subnet.

4. The router according to claim 1, wherein the processor is further configured to execute the instructions stored on the memory to cause the router to perform at least the following:
determining that the bridge mode is set for the particular port according to a preset bridge mode table in which a correspondence relationship between at least one of the plurality of ports and the bridge mode is recorded.

5. The router according to claim 4, wherein
the bridge mode table is preset by a user of the private network or a network service provider.

6. The router according to claim 1, wherein the processor is further configured to execute the instructions stored on the memory to cause the router to perform at least the following:
storing the public network IP address in association with a private network IP address that is a source address of the first private network data packet.

7. The router according to claim 6, wherein the processor is further configured to execute the instructions stored on the memory to cause the router to perform at least the following:
in a case where a source address of a second private network data packet acquired matches a stored private network IP address and the bridge mode is set for an another port indicated by the identification information of the second private network data packet, transmitting the second private network data packet using the public network IP address associated with the stored private network IP address.

8. The router according to claim 6, wherein the processor is further configured to execute the instructions stored on the memory to cause the router to perform at least the following:
acquiring a public network data packet from a public network; and
transmitting the public network data packet by using a private network IP address associated with a stored public network IP address in a case where a public network IP address that is a destination address of the public network data packet matches the stored public network IP address.

9. A method for a router, comprising:
acquiring a private network data packet from a private network, and attaching identification information to the private network data packet, the identification information indicates that the private network data packet was acquired via a particular port of a plurality of ports of the router, wherein the identification information distinguishes the particular port from one or more other ports of the plurality of ports;
determining that a bridge mode is set for the particular port as indicated by the identification information of the private network data packet;
in response to determining that the bridge mode is set,
transmit a request to lease a public network Internet Protocol (IP) address to one or more servers;
receive one or more packets from the one or more servers, wherein the one or more packets provide one or more IP addresses;
select a packet from the one or more packets, the packet received from a server of the one or more servers, wherein the packet provides an IP address of the one or more IP addresses;
use the IP address as the public network IP address;
broadcast acceptance of the public network IP address of the packet so as to cause the one or more servers other than the server to revoke one or more IP addresses provided by the one or more servers other than the server; and
assigning a public network IP address of the packet to the first private network data packet; and
transmitting the first private network data packet by using the public network IP address assigned.

10. The method according to claim 9, wherein
the plurality of ports includes at least one of an Ethernet port, a MoCA port, a Wi-Fi port, and a USB port.

11. The method according to claim 9, wherein
a plurality of private network data packets from the private network acquired via different ones of the plurality of ports of the router use a same subnet.

12. The method according to claim 9, wherein
that the bridge mode is set for the particular port is determined according to a preset bridge mode table in which a correspondence relationship between at least one of the plurality of ports and the bridge mode is recorded.

13. The method according to claim 9, further comprising:
storing the public network IP address in association with a private network IP address that is a source address of the first private network data packet.

14. The method according to claim 13, wherein
in a case where a source address of a second private network data packet acquired matches a stored private network IP address and the bridge mode is set for an another port indicated by the identification information of the second private network data packet, the second private network data packet is transmitted by using the public network IP address associated with the stored private network IP address.

15. The method according to claim 13, further comprising:
acquiring a public network data packet from a public network; and
transmitting the public network data packet by using a private network IP address associated with a stored public network IP address in a case where a public network IP address that is a destination address of the public network data packet matches the stored public network IP address.

16. A non-transitory computer-readable medium for use with a processor, the non-transitory computer-readable medium having stored thereon instructions that, when executed by the processor, implement at least the following:
acquiring a private network data packet from a private network, and attaching identification information to the private network data packet, the identification information indicates that the private network data packet was acquired via a particular port of a plurality of ports, wherein the identification information distinguishes the particular port from one or more other ports of the plurality of ports;
determining that a bridge mode is set for the particular port as indicated by the identification information of the private network data packet;
in response to determining that the bridge mode is set, transmit a request to lease a public network Internet Protocol (IP) address to one or more servers;
receive one or more packets from the one or more servers, wherein the one or more packets provide one or more IP addresses;
select a packet from the one or more packets, the packet received from a server of the one or more servers, wherein the packet provides an IP address of the one or more IP addresses;
use the IP address as the public network IP address;
broadcast acceptance of the public network IP address of the packet so as to cause the one or more servers other than the server to revoke one or more IP addresses provided by the one or more servers other than the server; and
assigning the public network IP address of the packet to the first private network data packet; and
transmitting the first private network data packet by using the public network IP address assigned.

17. The non-transitory computer-readable medium according to claim 16, wherein
the plurality of ports include at least one of an Ethernet port, a MoCA port, a Wi-Fi port, and a USB port.

18. The non-transitory computer-readable medium according to claim 16, wherein
a plurality of private network data packets from the private network acquired via different ones of the plurality of ports of the router use a same subnet.

19. The non-transitory computer-readable medium according to claim 16, further having stored thereon instructions that, when executed by the processor, implement at least the following:
determining that the bridge mode is set for the particular port indicated by the identification information according to a preset bridge mode table in which a correspondence relationship between at least one of the plurality of ports and the bridge mode is recorded.

20. The non-transitory computer-readable medium according to claim 16, further having stored thereon instructions that, when executed by the processor, implement at least the following:
storing the public network IP address in association with a private network IP address that is a source address of the first private network data packet.

* * * * *